Jan. 6, 1931. P. D. PEARCE Re. 17,922
ICE CREAM DISPENSER
Original Filed Jan. 16, 1926
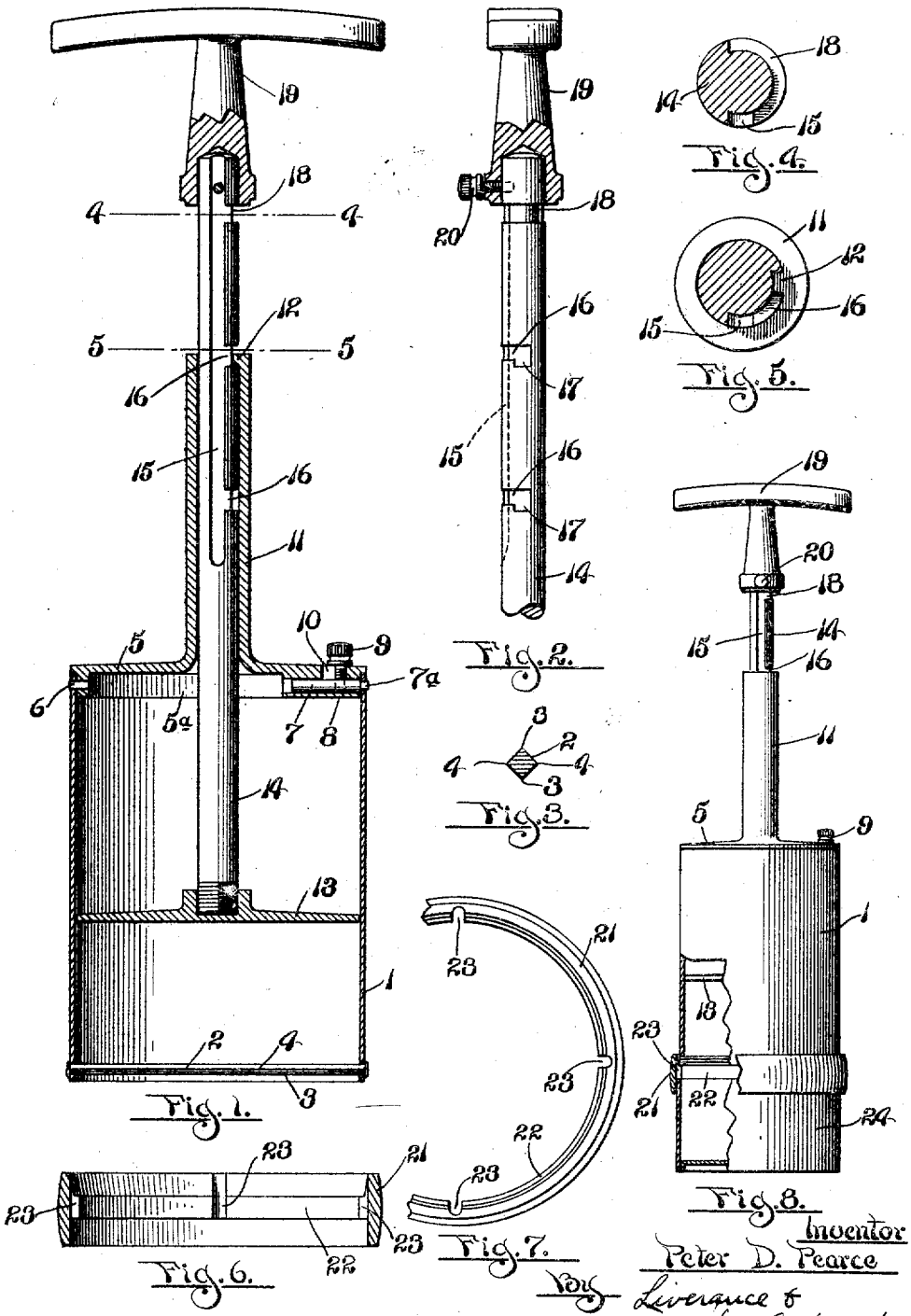
Inventor
Peter D. Pearce
by Livengood & Van Antwerp
Attorneys Reissued Jan. 6, 1931

Re. 17,922

UNITED STATES PATENT OFFICE

PETER D. PEARCE, OF PASADENA, CALIFORNIA

ICE-CREAM DISPENSER

Original No. 1,661,734, dated March 6, 1928, Serial No. 81,613, filed January 16, 1926. Application for reissue filed March 5, 1930. Serial No. 433,473.

This invention relates to an ice cream dispensing apparatus, it being a primary object and purpose of the present invention to provide an apparatus of this character by means of which a standard measured quantity of ice cream, such as a pint or a quart, may be readily taken from a large container for ice cream, used in stores, this ice cream, after having been taken in the desired measured quantity being ejected into a carton of the proper size to receive it. A further object and purpose of the present invention is to construct a device of this character in a very simple manner, making it of few parts which are very quickly and easily disassembled for purposes of cleaning the same so as to keep it in a sanitary condition. A still further object of the invention is a provision of a novel means for cutting the cream from its larger body in order that the same may be readily separated therefrom, and a still further object resides in the provision of a vented coupling ring between the ice cream dispensing apparatus and the carton into which it is to be placed. All of these features as well as various others not at this time specifically set forth, will appear as understanding of the invention is had from the following description taken in connection with the accompanying drawings, in which, Fig. 1 is a central vertical section through the ice cream dispensing device of my invention.

Fig. 2 is a fragmentary side elevation of the upper end of the plunger rod.

Fig. 3 is a transverse section through the cut off rod used at the bottom of the device.

Figs. 4 and 5 are enlarged horizontal sections taken substantially on the plane of lines 4—4 and 5—5 of Fig. 1.

Fig. 6 is a central vertical section through the coupling ring.

Fig. 7 is a fragmentary plan view thereof, and

Fig. 8 is an elevation, with parts broken away and in section, showing the coupling of the device to an ice cream holding carton.

Like reference characters refer to like parts in the several figures of the drawings.

In the construction of the device a cylindrical member 1 of sheet metal is provided, open at both ends. At the lower end thereof a bar 2 is postioned extending diametrically across the member 1 and being rigidly secured thereto at its ends. This bar is substantially square in cross section but is positioned so that two of its corners 3 are in a vertical plane and the other corners 4 in a horizontal plane as shown in Fig. 3.

In the upper end of the member 1 a head 5 is adapted to be detachably secured. Said head at its lower side is provided with a downwardly extending flange 5*a* of a diameter to pass within the inner sides of the member 1, said flange at one side carrying a pin 6 which may be passed at one end through an opening in a side of the member 1. Directly opposite a cylindrical guideway 8 is formed on the under side of the head 5 in which a cylindrical bolt 7 may be slidably mounted, its outer end being provided with a reduced portion 7*a* adapted to pass through a second opening in the wall of the member 1. An operating screw 9 has its shank passing through a slot 10 in the head 5, the lower end of the shank threading into the bolt 7. It is evident that on loosening the operating screw 9 it, with the attached bolt 7, may be moved inwardly to disconnect the part 7*a* from the member 1 whereupon the head 5 may be readily removed. But when the bolt is in the position shown in Fig. 1 and the operating screw 9 tightened so as to clamp its head against the upper side of the head 5, the parts are firmly held against detachment.

The head 5 at its center is provided with an upwardly extending cylindrical barrel or sleeve 11 at the upper end of which a lug 12 is formed extending inwardly into the opening through said sleeve. A disc 13 having a diameter so that it fits the interior of the cylindrical member 1, is located within said member and to it the lower end of a plunger rod 14 has threaded connection, said rod extending upwardly through the sleeve 11. In the upper portion of the rod 14 and in one side thereof a vertical groove 15 is formed, its upper end reaching to the upper end of the rod 14. At two spaced apart points in the length of this groove short lateral branch grooves 16 are made the same extending partly around the rod 14 and each at its end is formed with a short downward extension 17, as best shown in Fig. 2. Likewise near the upper end of the rod 14 a third lateral branch or groove 18 is made extending a little better than half way around the rod, the grooves 16 not extending more than one quarter of the way around the rod. At the upper end of the rod 14 a handle 19 is mounted being detachably secured to the rod by means of the set screw 20.

It is evident that with the lug 12 positioned in the groove 15, rod 14 may be moved vertically so as to carry the disc 13 to any position between its extremes of movement, one against the cutter bar 2 and the other against head 5. It is also evident that when a lateral or branch groove 16 comes to the lug 12 said rod 14 may be turned about its longitudinal axis a short distance so as to set said lug 12 in the closed end portion of a branch groove 16 and in the depressed portion 17 thereof, in which position the rod 14 will be substantially located against movement. The device as constructed is adapted to take either a pint or a quart of ice cream from a larger quantity thereof, that is, when the lug 12 is fitted in the upper lateral groove 16, as shown in Fig. 1, the disc 13 is between the upper and lower ends of the cylindrical containing member 1. The lower end of the member being forced into the ice cream, it can go only until the lower side of the disc 13 comes in contact with the cream. By reason of the cutting edge or corner 3 at the lower side of the rod 2, said rod passes through the cream readily. Then when that portion of the container 1 below the disc 13, is filled with the ice cream, by giving the whole apparatus a turning movement in a clock wise direction, the horizontal cutting edges 4 of the bar 2 sever that part of the cream within the container 1 from the main body of the cream and the device can be removed from the main supply of cream taking what is within the container 1 below the disc 13, with it. If, on the other hand, a larger supply of ice cream is desired, the disc 13 is elevated by moving rod 14 upward and setting the lug 12 in the lowermost groove 16, in which case a quart of the ice cream will be moved from the main body or bulk thereof.

Whether a pint or a quart is taken, the placing of the same in a carton is accomplished in the same manner by means of the coupling ring shown in Figs. 6, 7 and 8. This coupling ring 21 has an inner diameter so as to fit over the lower end of the member 1 and is formed at its inner side, between its upper and lower edges, with an inwardly extending ledge 22 against which the lower edges of the member 1 engage. A plurlaity of vertical vent grooves 23 are made at the inner sides of the ring 21, as shown. The ring also fits at its lower portion around the upper end of the carton 24, as shown in Fig. 7. When so placed together the rod 14 may be turned by means of the handle 19 until the groove 15 comes into alignment with the lug 12 and then by forcing the handle 19, rod 14 and disc 13 downwardly, the ice cream is forced from the container 1 into the carton, indicated at 24, and the air which must be displaced in the carton to receive the ice cream passes outwardly through the vent grooves 23.

It is evident that this construction can be manufactured at relatively low cost and that its assembly or disassembly is very quick and easy. The disassembly is particularly desirable in devices of this character for the purposes of cleaning and keeping the same in sanitary condition. The head 5 with the connected rod 14, disc 13 and handle 19 are quickly and easily detached from the cylindrical member 1, as previously described. The disassembly of the rod 14 from the head 5 is accomplished by loosening the set screw 20 and removing the handle 19 whereupon the rod may be moved longitudinally out of the sleeve 11. All of these parts may be then quickly and easily cleaned and their reassembly is accomplished in a very short time. The construction is durable and efficient and has so proved in practice. Various changes in minor detail may be resorted to without departing from the invention which is defined in the appended claims, and I consider myself entitled to all forms of structure coming within the scope of said claims.

I claim:

1. In a construction of the class described, a hollow cylindrical member open at both ends, a rod of small cross sectional area located across and secured at the lower end of the member, a head secured in and closing the upper end of said member, a push rod slidably mounted on and passing through said head, a circular disc attached to the lower end of the push rod within the cylindrical member and an open coupling ring formed between its upper and lower edges and at its inner side with an inwardly extending ledge against which the lower edge of the cylindrical member may bear when the coupling ring is placed thereover, said ledge being provided with a plurality of vertical grooves at spaced apart points, and the lower part of said coupling ring being adapted to receive the upper end of a carton, the upper edges of which will engage with the lower side of the ledge.

2. A device of the class described comprising, a cylindrical member adapted to be forced into a body of ice cream and provided with a rod of small cross sectional area across the end which is forced into said ice cream, whereby said member may be filled with the ice cream and on turning the same the rod will cut that in the cylindrical member from the main body of ice cream, means for forcing the ice cream from the cylindrical member, and a coupling ring adapted to be placed around the lower end of the said cylindrical member, said coupling ring having inwardly extending ledges against which the lower edge of the cylindrical member engages and against which the upper edge of a carton engages at the lower side thereof, said ring at the points of separation of the ledges providing vent passages for the escape of air from the carton when the ice cream is forced thereinto.

3. A device of the class described comprising, a cylindrical member adapted to be forced into a body of ice cream, means for forcing the ice cream from the cylindrical member, and a coupling ring adapted to be placed around the lower end of the said cylindrical member, said coupling ring having inwardly extending ledges against which the lower edge of the cylindrical member engages and against which the upper edge of a carton engages at the lower side thereof, said ring at the points of separation of the ledges providing vent passages for the escape of air from the carton when the ice cream is forced thereinto.

4. A device of the class described comprising, a cylindrical member adapted to be filled with ice cream, means for forcing the ice cream from the cylindrical member, and a coupling member adapted to receive the lower end of the cylindrical member and the upper end of a carton, means on the inner side of said coupling member to support the lower edge of the cylindrical member and the upper edge of the carton and means incorporated on the inner side of said coupling member to permit escape of air from said carton.

5. A device of the class described comprising, a cylindrical member adapted to be filled with ice cream, means for forcing the ice cream from the cylindrical member, and a coupling member adapted to receive the lower end of the cylindrical member and the upper end of a carton, and a groove in said coupling member communicating at its inner end with the carton and at its outer end outside of the carton and cylindrical member.

6. A device of the class described comprising, a cylindrical member adapted to be filled with ice cream, means for forcing the ice cream from the cylindrical member, and a coupling member adapted to receive the lower end of the cylindrical member and the upper end of a carton, means on the inner side of said coupling member to support the lower edge of the cylindrical member and the upper edge of the carton, and a groove in said coupling member communicating at its inner end with the carton and at its outer end outside of the carton and cylindrical member.

In testimony whereof I affix my signature.

PETER D. PEARCE.